United States Patent
Tamai et al.

(10) Patent No.: US 10,559,825 B2
(45) Date of Patent: Feb. 11, 2020

(54) POSITIVE ELECTRODE ACTIVE MATERIAL AND NONAQUEOUS ELECTROLYTE SECONDARY BATTERY

(71) Applicant: SANYO Electric Co., Ltd., Daito-shi, Osaka (JP)

(72) Inventors: Hidekazu Tamai, Hyogo (JP); Taizou Sunano, Tokushima (JP)

(73) Assignee: SANYO Electric Co., Ltd., Daito-shi (JP)

( * ) Notice: Subject to any disclaimer, the term of this patent is extended or adjusted under 35 U.S.C. 154(b) by 276 days.

(21) Appl. No.: 15/520,032

(22) PCT Filed: Dec. 7, 2015

(86) PCT No.: PCT/JP2015/006059
§ 371 (c)(1),
(2) Date: Apr. 18, 2017

(87) PCT Pub. No.: WO2016/103592
PCT Pub. Date: Jun. 30, 2016

(65) Prior Publication Data
US 2017/0324093 A1    Nov. 9, 2017

(30) Foreign Application Priority Data
Dec. 25, 2014   (JP) .................. 2014-263109

(51) Int. Cl.
*H01M 4/58* (2010.01)
*H01M 4/36* (2006.01)
*H01M 4/485* (2010.01)

(52) U.S. Cl.
CPC ........... *H01M 4/582* (2013.01); *H01M 4/366* (2013.01); *H01M 4/485* (2013.01)

(58) Field of Classification Search
None
See application file for complete search history.

(56) References Cited

U.S. PATENT DOCUMENTS

2006/0057466 A1   3/2006   Suhara et al.
2009/0104532 A1   4/2009   Hosoya
(Continued)

FOREIGN PATENT DOCUMENTS

JP   7-33443 A      2/1995
JP   2003-221235 A  8/2003
(Continued)

OTHER PUBLICATIONS

International Search Report dated Mar. 1, 2016, issued in counterpart of International Application No. PCT/JP2015/006059 (2 pages).

*Primary Examiner* — Carmen V Lyles-Irving
(74) *Attorney, Agent, or Firm* — Westerman, Hattori, Daniels & Adrian, LLP

(57) ABSTRACT

Provided are a positive electrode active material capable of suppressing the reduction in capacity of a battery and the generation of gas during storage at high temperature in a charged state and a nonaqueous electrolyte secondary battery including the positive electrode active material. A positive electrode active material particle (20) includes a lithium transition metal oxide particle (21) containing a halogen atom and rare-earth compound particles (22) attached to the surface of the lithium transition metal oxide particle (21). The amount of the halogen atom present on the surface of the lithium transition metal oxide particle (21) is 5 mass percent or less of the total amount of the halogen atom contained in the lithium transition metal oxide particle (21). A rare-earth element making up the rare-earth compound particles (22) is one other than yttrium and scandium.

6 Claims, 3 Drawing Sheets

(56) References Cited

U.S. PATENT DOCUMENTS

| | | |
|---|---|---|
| 2015/0221942 A1 | 8/2015 | Sugaya et al. |
| 2016/0020459 A1 | 1/2016 | Nishide et al. |

FOREIGN PATENT DOCUMENTS

| | | |
|---|---|---|
| JP | 2005-225734 A | 8/2005 |
| JP | 2006-351487 A | 12/2006 |
| JP | 4217712 B2 | 2/2009 |
| JP | 2009-104805 A | 5/2009 |
| WO | 2014/049958 A1 | 4/2014 |
| WO | 2014/156024 A1 | 10/2014 |

POSITIVE ELECTRODE ACTIVE MATERIAL AND NONAQUEOUS ELECTROLYTE SECONDARY BATTERY

TECHNICAL FIELD

The present invention relates to techniques for a positive electrode active material and a nonaqueous electrolyte secondary battery.

BACKGROUND ART

In association with advances in electronic devices in recent years, nonaqueous electrolyte secondary batteries used as power supplies for the electronic devices are being strongly required to have high energy density and high output. Measures to cope with such a requirement include measures to increase the capacity of active materials, measures to increase the fill of an active material per volume, and measures to increase the charge voltage of batteries.

Known techniques for increasing the charge voltage of batteries include methods using a lithium transition metal oxide containing a halogen atom as a positive electrode active material (refer to, for example, Patent Literatures 1 to 4).

CITATION LIST

Patent Literature

PTL 1: Japanese Published Unexamined Patent Application No. 7-33443
PTL 2: Japanese Published Unexamined Patent Application No. 2005-225734
PTL 3: Japanese Published Unexamined Patent Application No. 2003-221235
PTL 4: Japanese Published Unexamined Patent Application No. 2009-104805

SUMMARY OF INVENTION

Technical Problem

However, positive electrode active materials described in Patent Literatures 1 to 4 have a problem that a nonaqueous electrolyte is likely to be decomposed when the charge voltage of a battery is high. In particular, the following problems occur during storage at high temperature (for example, 60° C. or higher) in a charged state: problems such as the reduction in capacity of a battery due to the decomposition of a nonaqueous electrolyte and the swelling of a battery due to gas generation.

Accordingly, it is an object of the present invention to provide a positive electrode active material capable of suppressing, the reduction in capacity of a battery and the generation of gas during storage at high temperature in a charged state and a nonaqueous electrolyte secondary battery including the positive electrode active material.

Solution to Problem

A positive electrode active material contains a lithium transition metal oxide containing a halogen atom and a rare-earth compound attached to the surface of each particle of the lithium transition metal oxide. The amount of the halogen atom present on the surface of the lithium transition metal oxide particle is 5 mass percent or less of the total amount of the halogen atom contained in the lithium transition metal oxide particle. A rare-earth element making up the rare-earth compound is one other than yttrium and scandium.

Advantageous Effect of Invention

A positive electrode active material according to the present invention can suppress the reduction in capacity of a battery and the generation of gas during storage at high temperature in a charged state.

DESCRIPTION OF EMBODIMENTS

An embodiment of the present invention is described below. This embodiment is an example for carrying out the present invention. The present invention is not limited to this embodiment.

Figure 1:
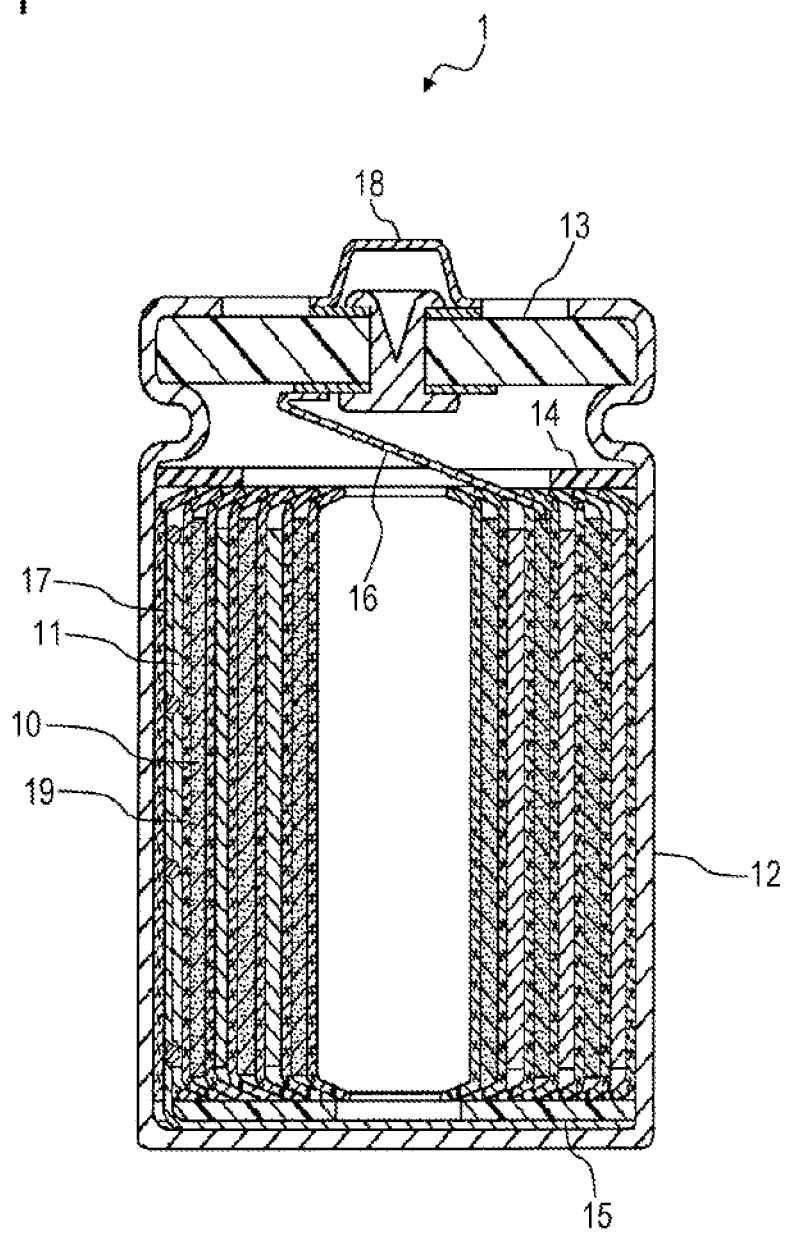
FIG. 1 is a sectional view of a nonaqueous electrolyte secondary battery which is an example of this embodiment.

FIG. 1 is a sectional view of a nonaqueous electrolyte secondary battery which is an example of this embodiment. As shown in FIG. 1, the nonaqueous electrolyte secondary battery 1 includes a positive electrode 10; a negative electrode 11; a separator 19 for nonaqueous electrolyte secondary batteries (hereinafter simply referred to as the "separator 19"), the separator 19 being interposed between the positive electrode 10 and the negative electrode 11; and a nonaqueous electrolyte (not shown). The positive electrode 10 and the negative electrode 11 are wound with the separator 19 therebetween and form a wound electrode group together with the separator 19. The nonaqueous electrolyte secondary battery 1 includes a cylindrical battery case 12 and a sealing plate 13. The wound electrode group and the nonaqueous electrolyte are housed in the battery case 12. An upper insulating plate 14 and a lower insulating plate 15 are placed on both longitudinal end portions of the wound electrode group. The positive electrode 10 is connected to one end of a positive electrode lead 16. The other end of the positive electrode lead 16 is connected to a positive electrode terminal 18 attached to the sealing plate 13. The negative electrode 11 is connected to one end of a negative electrode lead 17. The other end of the negative electrode lead 17 is connected to the inside bottom of the battery case 12. An open end portion of the battery case 12 is swaged to the sealing plate 13, whereby the battery case 12 is sealed.

In an example shown in FIG. 1, a cylindrical battery including the wound electrode group is illustrated. The application of the present disclosure is not limited to this. The shape of a battery may be, for example, a prismatic battery, a flat battery, a coin battery, a laminated film-packaged battery, or the like.

Members of the nonaqueous electrolyte secondary battery 1 according to this embodiment are described below.

(Positive Electrode)

The positive electrode 10 is composed of, for example, a positive electrode current collector such as metal foil and a positive electrode active material layer placed on the positive electrode current collector. Foil of metal, such as aluminium, stable in the potential range of the positive electrode; a film including a surface layer containing the metal; or the like can be used for the positive electrode current collector. The positive electrode active material layer contains a positive electrode active material and preferably further contains a conductive material and a binder.

Figure 2:
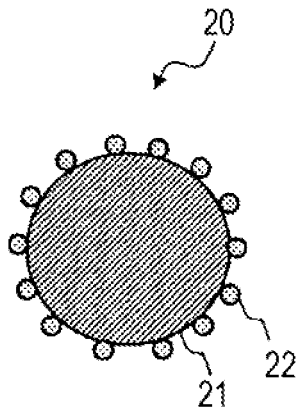
FIG. 2 is a schematic sectional view of a positive electrode active material particle according to this embodiment.

FIG. 2 is a schematic sectional view of a positive electrode active material particle according to this embodiment. The positive electrode active material particle 20 shown in FIG. 2 includes a lithium transition metal oxide particle 21 containing a halogen atom and rare-earth compound particles 22 attached to the surface of the lithium transition metal oxide particle 21. In this embodiment, the halogen atom is present in the inside of the lithium transition metal oxide particle 21 and the amount of the halogen atom present on the surface of the lithium transition metal oxide particle 21 is 5 mass percent or less of the total amount of the halogen atom contained in the lithium transition metal oxide particle 21. A rare-earth element making up a rare-earth compound is one other than yttrium and scandium.

The halogen atom present on the surface of the lithium transition metal oxide particle 21 refers to a halogen atom dissolved from the particle surface when a lithium transition metal oxide is dissolved in water. The amount (C) of the halogen atom present on the surface of the lithium transition metal oxide particle 21 can be determined from the following formula using a value (A) obtained by quantitatively analyzing the amount of the halogen atom dissolved in the water by ion chromatography:

$$C \text{ (mass percent)} = A/B \times 100$$

where B is the total amount of the halogen atom contained in the lithium transition metal oxide particle 21 and is the amount of the halogen atom theoretically contained in a particle as determined from the amount of an added halogen compound that is a raw material of the lithium transition metal oxide, which contains the halogen atom. The amount (D) of the halogen atom present in the inside of the lithium transition metal oxide particle 21 can be determined from the following formula:

$$D \text{ (mass percent)} = 100 - (A/B \times 100).$$

The amount of the halogen atom present on the surface of the lithium transition metal oxide particle 21 according to this embodiment may be 5 mass percent or less of the total amount of the halogen atom contained in the lithium transition metal oxide particle 21. From the viewpoint of the stability of a crystal structure, the amount of the halogen atom present within the range from the surface of the lithium transition metal oxide particle 21 to a depth of 10 nm is preferably 5 mass percent or less of the total amount of the halogen atom contained in the lithium transition metal oxide particle 21.

The lithium transition metal oxide, which contains the halogen atom, is produced in such a manner that a mixture containing lithium oxide, a transition metal oxide, the halogen compound, and the like that are raw materials is fired such that the raw materials are formed into solid solutions. Therefore, the unreacted halogen compound and halogen atom-containing by-products produced during the formation of the solid solutions are usually present on the surfaces of particles of the lithium transition metal oxide. Thus, in a conventional lithium transition metal oxide containing a halogen atom, the amount of the halogen atom present on the surface of a particle of the lithium transition metal oxide as determined from the above calculation formula is 5% or more of the total amount of the halogen atom contained in the particle. However, the lithium transition metal oxide containing the halogen atom according to this embodiment is produced in such a manner that, for example, a product obtained by forming the solid solutions by firing the above raw materials is sufficiently rinsed with pure water, an acidic aqueous solution, or the like such that the unreached halogen compound and halogen atom-containing by-products present on the surfaces of particles are removed. Therefore, the amount of the halogen atom present on the surface of the lithium transition metal oxide particle containing the halogen atom is 5 mass percent or less of the total amount of the halogen atom contained in the particle and is preferably 1 mass percent or less.

According to the above configuration, the decomposition of the nonaqueous electrolyte is suppressed during storage at high temperature in a charged state and therefore the reduction in capacity of the battery and the generation of gas are suppressed. Though this mechanism is unclear, reasons below are conceivable.

Figure 3:
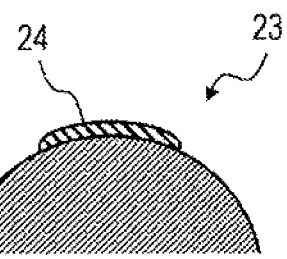
FIG. 3(A) is a partly cross-sectional schematic view of a conventional lithium transition metal oxide particle containing a halogen atom.
FIG. 3(B) is a partly cross-sectional schematic view of a positive electrode active material particle (the conventional positive electrode active material particle) obtained by attaching a rare-earth compound to the surface of the conventional lithium transition metal oxide particle containing the halogen atom.
FIG. 3(C) is a partly cross-sectional schematic view showing the state of the conventional positive electrode active material particle during storage at high temperature in a charged state.
Figure 3:
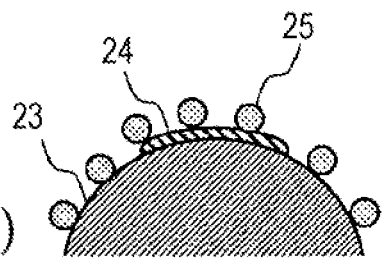
Figure 3:
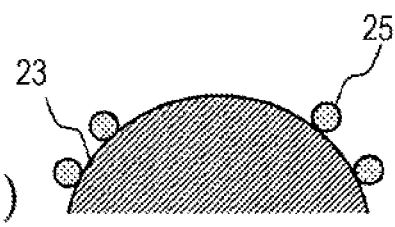

FIG. 3(A) is a partly cross-sectional schematic view of a conventional lithium transition metal oxide particle containing a halogen atom. FIG. 3(B) is a partly cross-sectional schematic view of a positive electrode active material particle (hereinafter referred to as the conventional positive electrode active material particle) obtained by attaching a rare-earth compound to the surface of the conventional lithium transition metal oxide particle containing the halogen atom. FIG. 3(C) is a partly cross-sectional schematic view showing the state of the conventional positive electrode active material particle during storage at high temperature in a charged state. In the case of the conventional lithium transition metal oxide, in which the amount of the halogen atom on the particle surface is more than 5 mass percent, as shown in FIG. 3(A), many halogen atom-containing compound particles 24 are present on the surface of the lithium transition metal oxide particle 23. The halogen atom-containing compound particles 24 are supposed to be the unreacted halogen compound and the by-products produced during the formation of the solid solutions as described above. Rare-earth compound particles 25 are attached in such a state that the many halogen atom-containing compound particles 24 are present on the surface of the lithium transition metal oxide particle 23, whereby the positive electrode active material particle, in which the rare-earth compound particles 25 are attached to the halogen atom-containing compound particles 24, is obtained as shown in FIG. 3(B).

Since the halogen atom-containing compound particles 24 have weak adhesion to the surface of the lithium transition metal oxide particle 23, the halogen atom-containing compound particles 24 are separated from the surface of the particle 23 by the expansion and contraction of the positive electrode active material in association with the charge and discharge of the battery. Therefore, as shown in FIG. 3(C), a surface (fresh surface) free from the rare-earth compound particles 25 is formed in the surface of the lithium transition metal oxide particle 23. In usual, a stable film with Li ion conductivity is formed on the surface of the lithium transition metal oxide particle 23 by the presence of the rare-earth compound particles 25. The decomposition of the nonaqueous electrolyte is suppressed by the film. However, no film that suppresses the decomposition of the nonaqueous electrolyte is formed on the fresh surface. Therefore, it is conceivable that the decomposition of the nonaqueous electrolyte is promoted on the fresh surface during storage at high temperature in a charged state and the reduction in capacity of the battery and the generation of gas due to the decomposition of the nonaqueous electrolyte are caused.

Figure 4:
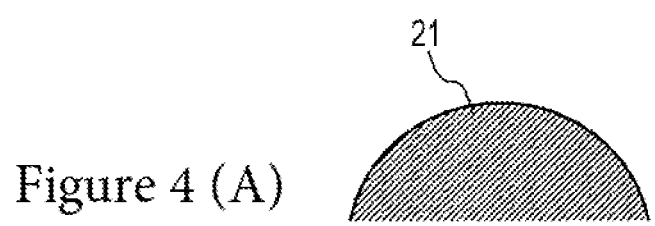
FIG. 4(A) is a partly cross-sectional schematic view of a lithium transition metal oxide particle containing a halogen atom according to this embodiment and FIG. 4(B) is a partly cross-sectional schematic view of a positive electrode active material particle obtained by attaching a rare-earth compound to the surface of the lithium transition metal oxide particle containing the halogen atom according to this embodiment.
Figure 4:
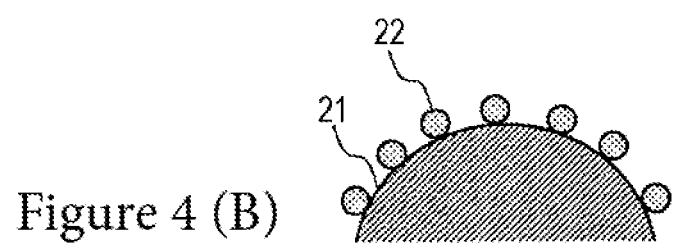

FIG. 4(A) is a partly cross-sectional schematic view of a lithium transition metal oxide particle containing a halogen atom according to this embodiment. FIG. 4(B) is a partly cross-sectional schematic view of a positive electrode active material particle obtained by attaching a rare-earth compound to the surface of the lithium transition metal oxide particle containing the halogen atom according to this embodiment. As shown in FIG. 4(A), in the lithium transition metal oxide particle 21, in which the amount of the halogen atom on the particle surface is 5% or less, substantially no compound containing a halogen atom is present on the particle surface. Thus, as shown in FIG. 4(B), it is conceivable that, in the positive electrode active material obtained by attaching the rare-earth compound particles 22 to the surface of the lithium transition metal oxide particle 21, substantially no surface (fresh surface) free from the rare-earth compound particles 22 is formed by the expansion and contraction of the positive electrode active material in association with the charge and discharge of the battery. Therefore, it is conceivable that the decomposition of the nonaqueous electrolyte is suppressed by the presence of the rare-earth compound particles 22 during storage at high temperature in a charged state and therefore the reduction in capacity of the battery and the generation of gas due to the decomposition of the nonaqueous electrolyte are suppressed.

Since the halogen atom is present in the inside of the lithium transition metal oxide particle 21 containing the halogen atom according to this embodiment, the structure of the lithium transition metal oxide is stabilized and lithium is smoothly intercalated into and deintercalated from the lithium transition metal oxide. As a result, the charge voltage of the battery can be increased and high energy density and high output can be achieved.

A rare-earth compound used in this embodiment is preferably at least one selected from a rare-earth hydroxide, a rare-earth oxyhydroxide, a rare-earth oxide, a rare-earth carbonate, a rare-earth phosphate, and a rare-earth fluoride. Among these compounds, at least one selected from the rare-earth hydroxide and the rare-earth oxyhydroxide is particularly preferable. Using these rare-earth compounds suppresses the decomposition of the nonaqueous electrolyte.

The rare-earth element, which makes up the rare-earth compound, is not particularly limited and may be one other than yttrium and scandium. The rare-earth element is at least one selected from lanthanum, cerium, praseodymium, neodymium, samarium, europium, gadolinium, terbium, dysprosium, holmium, erbium, thulium, ytterbium, and lutetium. Among these elements, neodymium, samarium, erbium, and lanthanum are particularly preferable. Neodymium, samarium, erbium, and lanthanum compounds have higher adhesion to lithium transition metal oxide particles as compared to other rare-earth compounds and further suppress the decomposition of the nonaqueous electrolyte during storage at high temperature in a charged state. Incidentally, yttrium and scandium compounds have lower adhesion to the lithium transition metal oxide particles as compared to other rare-earth compounds; hence, the effect of suppressing the decomposition of the nonaqueous electrolyte during storage at high temperature in a charged state cannot be sufficiently obtained.

Examples of the rare-earth compound include hydroxides such as neodymium hydroxide, samarium hydroxide, and erbium hydroxide; oxyhydroxides such as neodymium oxyhydroxide, samarium oxyhydroxide, and erbium oxyhydroxide; phosphates such as neodymium phosphate, samarium phosphate, and erbium phosphate; carbonates such as neodymium carbonate, samarium carbonate, and erbium carbonate; oxides such as neodymium oxide, samarium oxide, and erbium oxide; and fluorides such as neodymium fluoride, samarium fluoride, and erbium fluoride.

The average particle diameter of the rare-earth compound is preferably 1 nm to 100 nm and more preferably 5 nm to 80 nm. When the average particle diameter of the rare-earth compound is more than 100 nm, adhesion sites on the surface of each particle of the lithium transition metal oxide are imbalances in some cases and the effect of suppressing the decomposition of the nonaqueous electrolyte during storage at high temperature in a charged state is not sufficiently obtained in some cases. When the average particle diameter of the rare-earth compound is less than 1 nm, the surface of the lithium transition metal oxide particle may possibly be excessively covered and therefore lithium is not smoothly intercalated into or deintercalated from the lithium transition metal oxide in some cases.

The term "average particle diameter" as used herein refers to the particle diameter (volume-average particle diameter; $Dv_{50}$) at a cumulative volume percentage of 50% in the particle size distribution determined by a laser diffraction/scattering method. $Dv_{50}$ can be measured using, for example, "LA-750" manufactured by HORIBA.

The percentage (adhesion amount) of the rare-earth compound is preferably 0.005 mass percent to 0.5 mass percent with respect to the total mass of the lithium transition metal oxide in terms of the rare-earth element and more preferably 0.05 mass percent to 0.3 mass percent. When the above percentage is less than 0.005 mass percent, the amount of the rare-earth compound attached to the surface of the lithium transition metal oxide particle is small and therefore the effect of suppressing the decomposition of the nonaqueous electrolyte during storage at high temperature in a charged state is not sufficiently obtained in some cases. When the above percentage is more than 0.5 mass percent, the surface of the lithium transition metal oxide particle is excessively covered and therefore lithium is not smoothly intercalated into or deintercalated from the lithium transition metal oxide in some cases.

The lithium transition metal oxide, which contains the halogen atom, preferably has a concentration gradient that the halogen atom concentration (mass percent) increases from the surface of each particle toward the inside of the particle. The effect of suppressing a reaction with an electrolyte solution is higher as compared to lithium transition metal oxides having a concentration gradient that the halogen atom concentration of the outermost surface of each particle is highest and the halogen atom concentration decreases from the surface of the particle toward the inside of the particle; hence, the reduction of battery characteristics such as cycle characteristics can foe suppressed. The concentration gradient of the halogen atom preferably ranges from the particle surface to a depth of up to 1 µm. In battery characteristics such as cycle characteristics, substantially equivalent performance can be maintained as compared to the case where the concentration, gradient of the halogen atom ranges from the particle surface to a depth of more than 1 µm. The concentration gradient of the halogen atom can be measured by EDX (energy dispersive X-ray spectroscopy).

From the viewpoint of the structural stability of the lithium transition metal oxide, the lithium transition metal oxide, which contains the halogen atom, according to this embodiment preferably includes a lithium cobalt oxide containing a fluorine atom (lithium cobalt-containing fluoroxide) and particularly preferably includes a lithium cobalt-containing fluoroxide represented by the formula $Li_aCo_bA_cB_dO_eX_f$ (where A includes at least one selected from Al, Ti, Zr, Ni, and Mn; B includes at least one selected from Mg and Ca; a is 0.8 to 1.2; b is 0.75 to 1.0; c is 0 to 0.25; d is 0 to 0.03; e is 1.9 to 2.1; f is 0.0005 to 0.0035; and X is F). From the viewpoint of structural stability, the lithium cobalt-containing fluoroxide preferably contains the element A (Al, Ti, Zr, Ni, Mn). When the composition ratio (c) of the element A is more than 0.25, the energy density of the battery is reduced in some cases. From the viewpoint of structural stability, the lithium cobalt-containing fluoroxide preferably contains the element B (Mg, Ca). When the composition ratio (d) of the element B is more than 0.03, the energy density of the battery is reduced in some cases. When the composition ratio (f) of fluorine in the lithium cobalt-containing fluoroxide is less than 0.0005, the structural stability is reduced in some cases. When the composition ratio (f) is more than 0.0035, the energy density of the battery is reduced in some cases.

An example of a method for producing the lithium transition metal oxide, which contains the halogen atom, is described. A lithium compound, a transition metal compound, and the halogen compound that are raw materials are mixed together such that transition metal atoms and halogen atoms account for predetermined amounts at a molar ratio to Li atoms, followed by firing at a predetermined temperature, whereby a solid-solution product containing lithium, a transition metal, and a halogen is obtained. The solid-solution product is sufficiently rinsed with water, an acidic aqueous solution, or the like, whereby halogen atom-containing compounds present on the surfaces of particles of the solid-solution product are removed and the lithium transition metal oxide, in which the amount of halogen atoms on the particle surface is 5 mass percent or less, according to this embodiment is obtained. The pH of an aqueous solution used for rinsing preferably ranges from 5 to less than 10. When the pH of the aqueous solution is less than 5, not only fluorine atoms present on the surfaces of the solid-solution product particles but also fluorine, atoms present in the inside of each particle are removed in some cases.

A method for forming a concentration gradient that the halogen atom concentration (mass percent) increases from the surface of each particle toward the inside of the particle in the lithium transition metal oxide, which contains the halogen atom, is, for example, a method for selectively removing the halogen compound using a pH-controlled aqueous solution. For example, a weakly acidic aqueous solution is used to selectively remove LiF, whereby the above concentration gradient is formed.

Examples of the lithium compound, which is a raw material, include lithium hydroxide, lithium nitrate, lithium carbonate, and lithium chloride. Examples of the transition metal compound, which is a raw material, include hydroxides, nitrate, carbonates, and chlorides of transition metals such as Co, Ni, and Mn. Examples of the halogen compound, which is a raw material, include lithium salts, magnesium salts, calcium salts, and ammonia salts of fluorine, chlorine, bromine, and iodine. From the viewpoint of the stability of the crystal structure of the lithium transition metal oxide, lithium, fluoride (LiF), magnesium fluoride ($MgF_2$), or calcium fluoride ($CaF_2$) is preferably used as a raw material.

Examples of a method for attaching the rare-earth compound to the surfaces of particles of the lithium transition metal oxide particle, which contains the halogen atom, include a method for adding an aqueous solution containing a rare-earth element to a suspension containing the lithium transition metal oxide, which contains the halogen atom, and a method, for adding (spraying) an aqueous, solution containing a rare-earth element while the particles of the lithium transition metal oxide particle, which contains the halogen atom, are being mixed.

Using the above method enables a rare-earth hydroxide to be attached to the surfaces of the lithium transition metal oxide particles, which contains the halogen atom. The attached rare-earth hydroxide or a rare-earth oxyhydroxide is converted into an oxide by heat treatment. Furthermore, a rare-earth carbonate can be attached in such a manner that when the rare-earth compound is attached to the particle surface, a carbon dioxide atmosphere is used or carbon dioxide is dissolved in a suspension containing the lithium transition metal oxide.

The lithium transition metal oxide particles having the rare-earth compound, attached thereto are preferably heat-treated at, for example, 80° C. to 500° C. When the heat treatment temperature is lower than 80° C., it may possibly take an excessive time to sufficiently dry the positive electrode active material obtained by heat treatment. When the heat treatment temperature is higher than 500° C., a portion of the rare-earth compound attached to the surface may possibly diffuse into the lithium transition metal oxide particles to reduce the effect of suppressing the decomposition of the nonaqueous electrolyte, though the rare-earth hydroxide or oxyhydroxide is converted into an oxide.

One obtained by dissolving an acetate, a nitrate, a sulfate, an oxide, a chloride, or the like in water or an organic solvent can be used as an aqueous solution containing the rare-earth compound. One dissolved in water has high solubility and therefore is preferably used.

The positive electrode active material is not limited to the case of using the lithium transition metal oxide, which contains the halogen atom, alone and may be used in combination with another positive electrode active material. The other positive electrode active material is not particularly limited and may be a compound capable, of intercalating and deintercalating lithium ions. For example, those, such as lithium cobaltate and lithium nickel-cobalt-manganate, capable of intercalating and deintercalating lithium ions with a stable crystal structure maintained and having a layered structure; those, such as lithium manganese oxides and lithium nickel manganese oxides, having a spinel structure; and those having an olivine structure can be used.

In the case of mixing the lithium transition metal oxide, which contains the halogen atom, according to this embodiment with the other positive electrode active material, the content of the lithium transition metal oxide, which contains the halogen atom, according to this embodiment is preferably 50 mass percent or more with respect to the total amount of the positive electrode active material and more preferably 80 mass percent or more from the viewpoint of suppressing the reduction in capacity of the battery and the generation of gas during storage at high temperature in a charged state. In the case of using the same type of positive electrode active materials only or different types of positive electrode active materials, the positive electrode active materials used may have the same particle diameter or different particle diameters.

The conductive material is used to increase the electrical conductivity of the positive electrode active material. Carbon materials such as carbon black, acetylene black, Ketjenblack, and graphite can be exemplified as the conductive material. These may be used alone or in combination.

The binder is used to maintain a good contact between the positive electrode active material and the conductive material and to increase the bindability of the positive electrode active material and the like to a surface of the positive electrode current collector. Polytetrafluoroethylene (PTFE), polyvinylidene fluoride (PVdF), a modification thereof, or the like can be exemplified as the binder. The binder may be used in combination with a thickening agent such as carboxymethylcellulose (CMC) or polyethylene oxide (PEO). These may be used alone or in combination.

(Negative Electrode)

The negative electrode 11 includes, for example, a negative electrode current collector such as metal foil and a negative electrode active material layer placed on the negative electrode current collector. Foil of metal, such as copper, stable in the potential range of the negative electrode; a film including a surface layer containing metal, such as copper, stable in the potential range of the negative electrode; or the like can be used for the negative electrode current collector. The negative electrode active material layer preferably contains a negative electrode active material capable of intercalating and deintercalating lithium ions and a binder. In common with the positive electrode, PTFE or the like can be used as the binder. A styrene-butadiene copolymer (SBR), a modification thereof, or the like is preferably used. The binder may be used in combination with a thickening agent such as CMC.

A carbon material capable of intercalating and deintercalating lithium, a metal capable of alloying with lithium, or an alloy compound containing the metal is cited as the negative electrode active material. Graphites such as natural graphite, non-graphitizable carbon, synthetic graphite; cokes; and the like can be used as the carbon material. One containing at least one metal capable of alloying with lithium is cited as the alloy compound. In particular, an element capable of alloying with lithium is preferably silicon or tin. Silicon oxide and tin oxide, which are produced by combining silicon and tin, respectively, with oxygen can be used. Furthermore, a mixture of the carbon material and a silicon or tin compound can be used. In addition to the above, one, such as lithium titanate, having a charge/discharge potential, versus metallic lithium, higher than the carbon material can be used.

(Separator)

A porous sheet having ion permeability and insulating properties is used for the separator 19. Examples of the porous sheet include microporous thin films, woven fabrics, and unwoven fabrics. A material for the separator is preferably a polyolefin such as polyethylene or polypropylene.

(Nonaqueous Electrolyte)

The nonaqueous electrolyte contains a nonaqueous solvent and an electrolyte salt dissolved in the nonaqueous solvent. The following compounds can be used as the electrolyte salt in the nonaqueous electrolyte: for example, $LiClO_4$, $LiBr_4$, $LiPF_6$, $LiAlCl_4$, $LiSbF_6$, $LiSCN$, $LiCF_3SO_3$, $LiCF_3Co_2$, $LiAsF_6$, $LiB_{10}O_{10}$, lithium lower aliphatic carboxylates, LiCl, LiBr, LiI, chloroborane lithium, borates, imide salts, and the like. Among these compounds, $LiPF_6$ is preferably used from the viewpoint of ionic conductivity and electrochemical stability. Electrolyte salts may be used alone or in combination. In 1 L of the nonaqueous electrolyte, 0.8 mol to 1.5 mol of these electrolyte salts are preferably contained.

For example, a cyclic carbonate, a linear carbonate, a cyclic, carboxylate, or the like is used as the nonaqueous electrolyte. Examples of the cyclic carbonate include propylene carbonate (PC), ethylene carbonate (EC), and fluoroethylene carbonate (FEC). Examples of the linear carbonate include diethyl carbonate (DEC), ethyl methyl carbonate (EMC), and dimethyl carbonate (DMC). Examples of the cyclic carboxylate include γ-butyrolactone (GBL) and γ-valerolactone (GVL). Examples of a linear carboxylate include methyl propionate (MP) and fluoromethyl propionate (BMP). Nonaqueous electrolytes may be used alone or in combination.

EXAMPLES

The present invention is further described below with reference to examples. The present invention is not limited to the examples.

Example 1

[Preparation of Positive Electrode]

Lithium carbonate ($Li_2CO_3$) which was a lithium source and $(Co_{0.99}Al_{0.01})_3O_4$ which was a cobalt source and which was obtained by hybridizing tricobalt tetraoxide with Al were used as starting materials. The one obtained by hybridizing tricobalt tetraoxide with Al was obtained in such a manner that cobalt and Al dissolved in an acid solution were precipitated in the form of a composite hydroxide, followed by calcination at 300° C. Next, after the lithium carbonate and the one obtained by hybridizing tricobalt tetraoxide with Al were weighed such that the Li/(Co+Al) molar ratio was 1.05, LiF was added thereto such that the amount of a fluorine element was 1.0 mole percent with respect to (Co+Al) in a positive electrode active material, followed by mixing these materials. Next, this mixture was fired in an air atmosphere, whereby a lithium cobalt-containing fluoroxide which had an average particle diameter of 10 µm or less, which contained fluorine, and which had a layered rock salt structure was obtained. Next, an unreacted substance (LiF) or by-products (LiF, ALF, and the like) present on the surfaces of particles of the lithium cobalt-containing fluoroxide were removed using an HCl aqueous solution adjusted to a pH of 6.

Next, 15 mL of an aqueous solution containing 0.068 mass percent of erbium hydrate was sprayed on the lithium cobalt-containing fluoroxide particles, followed by suction filtration and then water rinsing. Obtained powder was dried at 120° C., whereby an erbium compound was attached to the surfaces of the lithium cobalt-containing fluoroxide particles. Thereafter, the obtained powder was heat-treated at 300° C. for 5 hours in air. This prepared a positive electrode active material.

Herein, the obtained positive electrode active material was observed with a scanning electron microscope (SEM), whereby it was confirmed that a rare-earth compound with an average particle diameter of 1 nm to 100 nm was immobilized on the surface of the positive electrode active material. The amount of the immobilized rare-earth compound was measured by ICP and was found to be 0.068 mass percent with respect to lithium cobaltate in terms of a rare-earth element. A cross section of a particle of the positive electrode active material was measured by EDX, whereby it was confirmed that the particle had a concentration gradient that the fluorine atom concentration increased from the surface of the particle toward the inside of the particle within the range from the particle surface to a depth of about 1 μm. Incidentally, at a depth of more than 1 μm, substantially no fluorine atom was detected by EDX; hence, trace amounts of fluorine atoms were supposed to be substantially uniformly present. The positive electrode active material was dispersed in water, followed by stirring for 1 hour and then filtering the positive electrode active material, whereby a filtrate was obtained. The filtrate was measured by ICP, whereby the amount of fluorine atoms on the surface of each particle of the positive electrode active material was found to be 5 mass percent or less with respect to the total amount of fluorine atoms in the positive electrode active material particle and the amount of fluorine atoms in the inside of the positive electrode active material particle was 95 mass percent with respect to the total amount of the fluorine atoms in the positive electrode active material particle.

The positive electrode active material particle, a carbon black (acetylene black) powder (an average particle diameter of 40 nm) serving as a conductive agent, and polyvinylidene fluoride (PVdF) serving as a binder were weighed such that the mass ratio was 95:2.5:2.5. These were kneaded in an NMP solution, whereby positive electrode mix slurry was prepared. The positive electrode mix slurry was applied to both surfaces of a positive electrode current collector made of aluminium foil and was dried, followed by rolling with a rolling roller, whereby a positive electrode including the positive electrode current collector and positive electrode mix layers formed on both surfaces of the positive electrode current collector was prepared. The packing density of the positive electrode was 3.4 g/cc.

[Preparation of Negative Electrode]

Synthetic graphite that was a negative electrode active material, carboxymethylcellulose sodium serving as a dispersant, and styrene-butadiene rubber serving as a binder were mixed in an aqueous solution at a mass ratio of 98:1:1, whereby negative electrode mix slurry was prepared. Next, the negative electrode mix slurry was uniformly applied to both surfaces of a negative electrode current collector made of copper foil and was dried, followed by rolling with a rolling roller, whereby a negative electrode including the negative electrode current collector and negative electrode mix layers formed on both surfaces of the negative electrode current collector was obtained. The packing density of the negative electrode active material in the negative electrode was 1.65 g/cc.

[Preparation of Nonaqueous Electrolyte]

Lithium hexafluorophosphate ($LiPF_6$) was dissolved in a solvent mixture of ethylene carbonate (EC), methyl ethyl carbonate (MEC), and diethyl carbonate (DEC) mixed at a volume ratio of 3:5:2 such that the concentration of lithium hexafluorophosphate was 1.0 mole per liter, whereby a nonaqueous electrolyte solution was prepared.

[Test Cell]

A lead terminal was attached to each of the positive and negative electrodes. After these electrodes were spirally wound with a separator therebetween, a core was pulled out, whereby a spiral electrode assembly was prepared. Furthermore, the electrode assembly was squashed, whereby at flat electrode assembly was obtained. Next, the flat electrode assembly and the nonaqueous electrolyte solution, were provided in an enclosure made of an aluminium laminate, followed by sealing, whereby a battery was prepared. The design capacity (the discharge capacity when being charged to 4.40 V and being discharged to 2.75 V) of the battery was 750 mAh.

Example 2

A battery was prepared in substantially the same manner as that used in Example 1 except that the amount of added LiF was changed from 1.0 mole percent to 0.25 mole percent. The amount of fluorine atoms on the surface of each particle of a positive electrode active material used in Example 2 was 1 mass percent or less with respect to the total amount of fluorine atoms in the positive electrode active material particle. The amount of fluorine atoms in the inside of the positive electrode active material particle was 99 mass percent with respect to the total amount of fluorine atoms in the positive electrode active material particle.

Example 3

A battery was prepared in substantially the same manner as that used in Example 1 except that the amount of added LiF was changed from 1.0 mole percent to 5.0 mole percent. The amount of fluorine atoms on the surface of each particle of a positive electrode active material used in Example 3 was 5 mass percent or less with respect to the total amount of fluorine atoms in the positive electrode active material particle. The amount of fluorine atoms in the inside of the positive electrode active material particle was 95 mass percent with respect to the total amount of fluorine atoms in the positive electrode active material particle.

Example 4

A battery was prepared in substantially the same manner as that used in Example 1 except that the amount of added LiF was changed from 1.0 mole percent to 10.0 mole percent. The amount of fluorine atoms on the surface of each particle of a positive electrode active material used in Example 4 was 5 mass percent or less with respect to the total amount of fluorine atoms in the positive electrode active material particle. The amount of fluorine atoms in the inside of the positive electrode active material particle was 95 mass percent with respect to the total amount of fluorine atoms in the positive electrode active material particle.

Comparative Example 1

A battery was prepared in substantially the same manner as that used in Example 1 except that no LiF was added.

Comparative Example 2

A battery was prepared in substantially the same manner as that used in Example 1 except that after a positive electrode active material which contained fluorine atoms and which had a layered rock salt structure was obtained, a rare-earth compound was attached to the surfaces of particles of the positive electrode active material without removing an unreached substance (LiF) or by-products (LiF, $AlF_3$, and the like) present on the surfaces of the positive electrode active material particles. The amount of fluorine atoms on the surface of each particle of the positive electrode active material used in Comparative Example 2 was 70 mass percent with respect to the total amount of fluorine atoms in the positive electrode active material particle. The amount of fluorine atoms in the inside of the positive electrode active material particle was 30 mass percent with respect to the total amount of fluorine atoms in the positive electrode active material particle.

Comparative Example 3

A battery was prepared in substantially the same manner as that used in Example 1 except that no rare-earth compound was attached to the surfaces of particles of a positive electrode active material. The amount of fluorine atoms on the surface of each particle of the positive electrode active material used in Comparative Example 3 was 5 mass percent with respect to the total amount of fluorine atoms in the positive electrode active material particle. The amount of fluorine atoms in the inside of the positive electrode active material particle was 95 mass percent with respect to the total amount of fluorine atoms in the positive electrode active material particle.

Examples 5 to 8 and Comparative Examples 4 and 5

In Examples 5 to 8, batteries were prepared. In Example 5, a battery was prepared under substantially the same conditions as those used in Example 1 except that a samarium compound was used instead of the erbium compound used in Example 1. In Example 6, a battery was prepared under substantially the same conditions as those used in Example 2 except that the samarium compound was used instead of the erbium compound used in Example 1. In Example 7, a battery-was prepared under substantially the same conditions as those used in Example 3 except that the samarium compound was used instead of the erbium compound used in Example 1. In Example 8, a battery was prepared under substantially the same conditions as those used in Example 4 except that the samarium compound was used instead of the erbium compound used in Example 1. The amount of fluorine atoms in each of Examples 5 to 8 was the same as that in a corresponding one of Examples 1 to 4. In Comparative Example 5, a battery was prepared in substantially the same manner as that used in Example 5 except that no LiF was added. In Comparative Example 5, a battery was prepared in substantially the same manner as that used in Example 5 except that no fluorine on the surfaces of particles was removed. The amount of fluorine atoms in Comparative Example 5 was the same as that in Comparative Example 2.

Examples 9 to 12 and Comparative Examples 6 and 7

In Examples 9 to 12, batteries were prepared. In Example 9, a battery was prepared under substantially the same conditions as those used in Example 1 except that a lanthanum compound was used instead of the erbium compound used in Example 1. In Example 10, a battery was prepared under substantially the same conditions as those used in Example 2 except that the lanthanum compound was used instead of the erbium compound used in Example 1. In Example 11, a battery was prepared under substantially the same conditions as those used in Example 3 except that the lanthanum compound was used instead of the erbium compound used in Example 1. In Example 12, a battery was prepared under substantially the same conditions as those used in Example 4 except that the lanthanum compound was used instead of the erbium compound used in Example 1. The amount of fluorine atoms in each of Examples 9 to 12 was the same as that in a corresponding one of Examples 1 to 4. In Comparative Example 6, a battery was prepared in substantially the same manner as that used in Example 9 except that no LiF was added. In Comparative Example 7, a battery was prepared in substantially the same manner as that used in Example 9 except that no fluorine on the surfaces of particles was removed. The amount of fluorine atoms in Comparative Example 7 was the same as that in Comparative Example 2.

Examples 13 to 16 and Comparative Examples 8 and 9

In Examples 13 to 16, batteries were prepared. In Example 13, a battery was prepared under substantially the same conditions as those used in Example 1 except that a neodymium compound was used instead of the erbium compound used in Example 1. In Example 14, a battery was prepared under substantially the same conditions as those used in Example 2 except that the neodymium compound was used instead of the erbium compound used in Example 1. In Example 15, a battery was prepared under substantially the same conditions as those used in Example 3 except that the neodymium compound was used instead of the erbium compound used in Example 1. In Example 16, a battery was prepared under substantially the same conditions as those used in Example 4 except that the neodymium compound was used instead of the erbium compound used in Example 1. The amount of fluorine atoms in each of Examples 13 to 16 was the same as that in a corresponding one of Examples 1 to 4. In Comparative Example 8, a battery was prepared in substantially the same manner as that used in Example 13 except that no LiF was added. In Comparative Example 9, a battery was prepared in substantially the same manner as that used in Example 13 except that no fluorine on the surfaces of particles was removed. The amount of fluorine atoms in Comparative Example 9 was the same as that in Comparative Example 2.

(Evaluation of Trickle Charge)

The above batteries were trickle-charged under conditions below. That is, each battery was charged with a current of 1.0 lt (750 mA) in a 60° C. environment in a constant current mode until the voltage of the battery reached 4.40 V. Furthermore, the battery was charged with a voltage of 4.40 V for 65 hours in a constant voltage mode. The trickle-charged battery was measured for thickness and discharge capacity. The change in thickness of the battery was determined from the thickness of the uncharged battery and the thickness of the trickle-charged battery. The discharge capacity retention of the battery was determined from the initial capacity of the battery and the discharge capacity of the trickle-charged battery.

Tables 1 to 4 summarize results of the change in thickness and discharge capacity retention of the batteries prepared in Examples 1 to 16 and Comparative Examples 1 to 9. It is shown that as the change in thickness of each battery is smaller, the amount of gas generated by the decomposition of a nonaqueous electrolyte during storage at high temperature in a charged state is smaller. Furthermore, it is shown that as the discharge capacity retention of the battery is higher, the reduction in capacity of the battery during storage at high temperature in a charged state is lower. Table 1 shows the composition ratio (f-value) of fluorine in the positive electrode active material used in each of Examples and Comparative Examples.

TABLE 1

| | Conditions | | | After storage at high temperature of 60° C. in charged state | | |
|---|---|---|---|---|---|---|
| | Amount of mixed LiF | Removal of F from particle surface | Attachment of Er | Rate of change in thickness (%) | Discharge capacity retention (%) | f-Value |
| Example 1 | 1 mole percent | Performed | Performed | 29 | 80 | 0.00005 |
| Example 2 | 0.25 mole percent | Performed | Performed | 54 | 75 | 0.0003 |
| Example 3 | 5 mole percent | Performed | Performed | 11 | 84 | 0.0016 |
| Example 4 | 10 mole percent | Performed | Performed | 26 | 84 | 0.0035 |
| Comparative Example 1 | 0 | Not performed | Performed | 88 | 48 | 0 |
| Comparative Example 2 | 1 mole percent | Not performed | Performed | 164 | 21 | 0.01 |
| Comparative Example 3 | 1 mole percent | Performed | Not performed | 62 | 29 | 0.0001 |

TABLE 2

| | Conditions | | | After storage at high temperature of 60° C. in charged state | | |
|---|---|---|---|---|---|---|
| | Amount of mixed LiF | Removal of F from particle surface | Attachment of Sm | Rate of change in thickness (%) | Discharge capacity retention (%) | f-Value |
| Example 5 | 1 mole percent | Performed | Performed | 35 | 78 | 0.00005 |
| Example 6 | 0.25 mole percent | Performed | Performed | 58 | 75 | 0.0003 |
| Example 7 | 5 mole percent | Performed | Performed | 14 | 83 | 0.0016 |
| Example 8 | 10 mole percent | Performed | Performed | 28 | 80 | 0.0035 |
| Comparative Example 4 | 0 | Not performed | Performed | 102 | 42 | 0 |
| Comparative Example 5 | 1 mole percent | Not performed | Performed | 186 | 20 | 0.01 |

TABLE 3

| | Conditions | | | After storage at high temperature of 60° C. in charged state | | |
|---|---|---|---|---|---|---|
| | Amount of mixed LiF | Removal of F from particle surface | Attachment of La | Rate of change in thickness (%) | Discharge capacity retention (%) | f-Value |
| Example 9 | 1 mole percent | Performed | Performed | 33 | 80 | 0.00005 |
| Example 10 | 0.25 mole percent | Performed | Performed | 56 | 78 | 0.0003 |
| Example 11 | 5 mole percent | Performed | Performed | 10 | 86 | 0.0016 |
| Example 12 | 10 mole percent | Performed | Performed | 30 | 82 | 0.0035 |
| Comparative Example 6 | 0 | Not performed | Performed | 90 | 30 | 0 |
| Comparative Example 7 | 1 mole percent | Not performed | Performed | 156 | 28 | 0.01 |

TABLE 4

| | Conditions | | | After storage at high temperature of 60° C. in charged state | | |
|---|---|---|---|---|---|---|
| | Amount of mixed LiF | Removal of F from particle surface | Attachment of Nd | Rate of change in thickness (%) | Discharge capacity retention (%) | f-Value |
| Example 13 | 1 mole percent | Performed | Performed | 35 | 81 | 0.00005 |
| Example 14 | 0.25 mole percent | Performed | Performed | 58 | 85 | 0.0003 |
| Example 15 | 5 mole percent | Performed | Performed | 16 | 78 | 0.0016 |
| Example 16 | 10 mole percent | Performed | Performed | 35 | 75 | 0.0035 |
| Comparative Example 8 | 0 | Not performed | Performed | 100 | 25 | 0 |
| Comparative Example 9 | 1 mole percent | Not performed | Performed | 181 | 17 | 0.01 |

As is clear from Tables 1 to 4, Examples 1 to 16, in which the rare-earth compound was attached to the lithium cobalt-containing fluoroxide in which the amount of fluorine atoms present on the particle surface was 5 mass percent or less, show results that the change in thickness of the batteries is smaller and the discharge capacity retention of the batteries is higher as compared to Comparative Examples 1, 4, 6, and 8, in which the rare-earth compound was attached to the lithium cobalt-containing fluoroxide containing no fluorine, Comparative Examples 2, 5, 7, and 9, in which the rare-earth compound is attached to the lithium cobalt-containing fluoroxide in which the amount of fluorine atoms present on the particle surface was 70 mass percent or more, and Comparative Example 3, in which no rare-earth compound was attached to the lithium cobalt-containing fluoroxide in which the amount of fluorine atoms present on the particle surface was 5 mass percent or less. That is, it can be said that Examples 1 to 16 can suppress the reduction in capacity of the batteries and the generation of gas during storage at high temperature in a charged state as compared to Comparative Examples 1 to 9.

REFERENCE SIGNS LIST

1 Nonaqueous electrolyte secondary battery
10 Positive electrode
11 Negative electrode
12 Battery case
13 Sealing plate
14 Upper insulating plate
15 Lower insulating plate
16 Positive electrode lead
17 Negative electrode lead
18 Positive electrode terminal
19 Separator for nonaqueous electrolyte secondary batteries
20 Positive electrode active material particle
21, 23 Lithium transition metal oxide particle
22, 25 Rare-earth expound particles
24 Halogen atom-containing compound particle

The invention claimed is:

1. A positive electrode active material comprising a lithium transition metal oxide containing a halogen and a rare-earth compound attached to the surface of each particle of the lithium transition metal oxide,
   wherein the amount of the halogen present on the surface of the lithium transition metal oxide particle is 5 mass percent or less of the total amount of the halogen contained in the lithium transition metal oxide particle,
   a rare-earth element in the rare-earth compound is one other than yttrium and scandium, and
   wherein the lithium transition metal oxide containing the halogen comprises a lithium cobalt oxide, represented by the formula $Li_aCo_bA_cB_dO_eX_f$ (where A includes at least one selected from Al, Ti, Zr, Ni, and Mn; B includes at least one selected from Mg and Ca; a is 0.8 to 1.2; b is 0.75 to 1.0; c is 0 to 0.25; d is 0 to 0.03; e is 1.9 to 2.1; f is 0.0005 to 0.0035; and X is F).

2. The positive electrode active material according to claim 1, wherein the lithium transition metal oxide containing the halogen has a concentration gradient that the halogen concentration increases from the surface of each particle toward the inside of the particle.

3. The positive electrode active material according to claim 2, wherein the concentration gradient of the halogen ranges from the surface of each particle to a depth of up to 1 μm.

4. A nonaqueous electrolyte secondary battery comprising a positive electrode containing the positive electrode active material according to claim 1.

5. A nonaqueous electrolyte secondary battery according to claim 4, wherein the lithium transition metal oxide containing the halogen has a concentration gradient that the halogen concentration increases from the surface of each particle toward the inside of the particle.

6. A nonaqueous electrolyte secondary battery according to claim 5, wherein the concentration gradient of the halogen ranges from the surface of each particle to a depth of up to 1 μm.

* * * * *